No. 708,568. Patented Sept. 9, 1902.
A. F. LORENZEN.
APPARATUS FOR TEACHING PRIMARY ARITHMETIC.
(Application filed Apr. 12, 1901.)
(No Model.) 2 Sheets—Sheet 1.
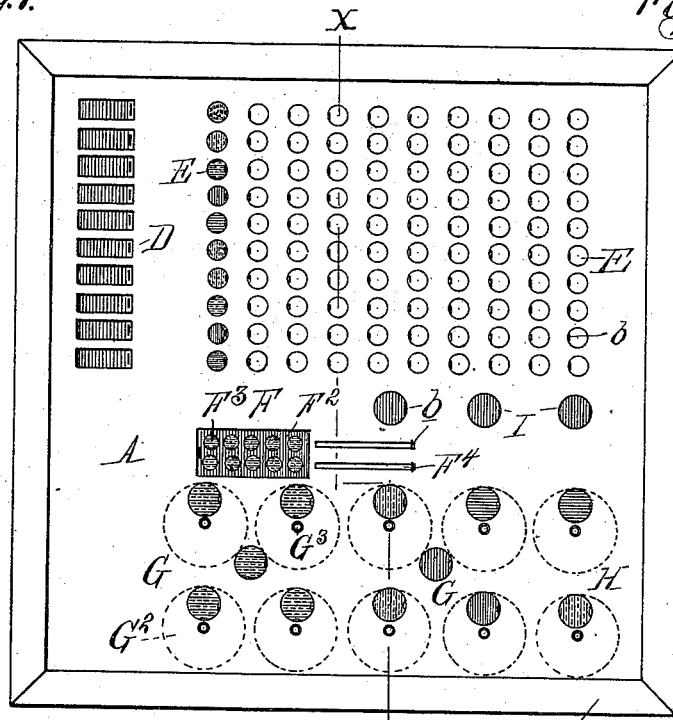
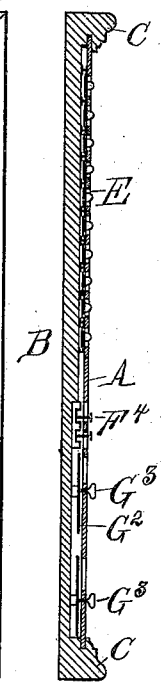
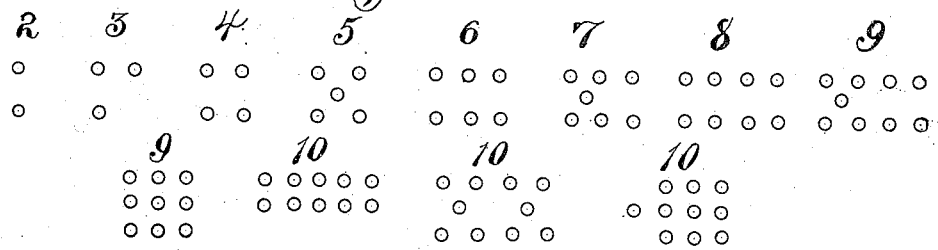
Witnesses: Inventor:
Joseph A. Noelke   Asmus F. Lorenzen,
J. M. Schowalter   By Barthel & Barthel
                   Attorneys.

No. 708,568. Patented Sept. 9, 1902.
A. F. LORENZEN.
APPARATUS FOR TEACHING PRIMARY ARITHMETIC.
(Application filed Apr. 12, 1901.)
(No Model.)
2 Sheets—Sheet 2.
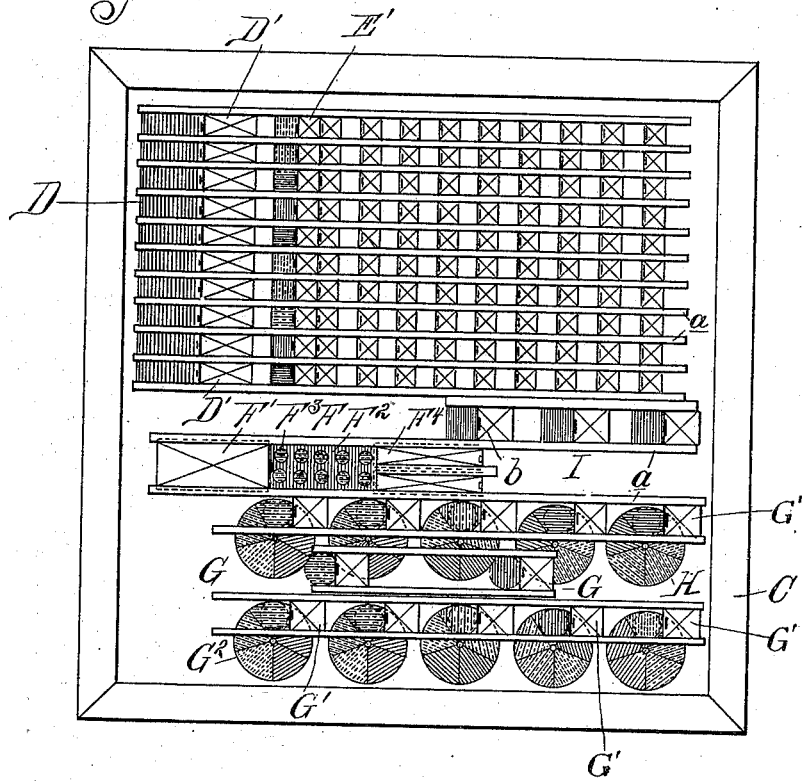
Witnesses:
Inventor:
Asmus F. Lorenzen,
By 
Attorneys

UNITED STATES PATENT OFFICE.

ASMUS F. LORENZEN, OF DETROIT, MICHIGAN.

APPARATUS FOR TEACHING PRIMARY ARITHMETIC.

SPECIFICATION forming part of Letters Patent No. 708,568, dated September 9, 1902.

Application filed April 12, 1901. Serial No. 55,523. (No model.)

*To all whom it may concern:*

Be it known that I, ASMUS F. LORENZEN, a citizen of the United States of America, residing at Detroit, in the county of Wayne and State of Michigan, have invented certain new and useful Improvements in Apparatus for Teaching Primary Arithmetic, of which the following is a specification, reference being had therein to the accompanying drawings.

The object of this invention is to provide the teacher with an appliance for teaching primary arithmetic and in a manner which does away with the time-taking and wearisome task of counting the objects, as required with the present appliances. To this end, instead of teaching numbers by means of objects placed in a row or rows, I provide an apparatus in which the numbers may be produced by what I call "number-pictures"— that is, with the objects representing a given number grouped in such a manifest manner that the perception of the same is soon transferred to the memory and easily transformed into a concept of the mind. Thus, for instance, while ten objects placed in a row represent the number "10," it cannot be instantly recognized without first counting the objects; but if the ten objects appear in two groups of five arranged like the dots on the five of a dice we have a number-picture which we will easily recognize as the number "10" without counting. My invention is not only designed to provide an apparatus whereby such easily-discernible number-pictures may be instantly produced upon a blackboard, but also to provide means for carrying out a method of teaching based upon the study of such number itself, all as more fully hereinafter described, and shown in the accompanying drawings, in which—

Figure 1 is a front elevation of my apparatus. Fig. 2 is a like elevation with the perforated face-plate removed and the slides withdrawn. Fig. 3 is a vertical section on line $x$ $x$, Fig. 1. Fig. 4 is the key of the color scheme. Fig. 5 is a diagram of the number-pictures for the numbers "2" to "10."

A is the face of the apparatus, preferably formed of sheet metal painted black in imitation of a blackboard.

B is the back, preferably formed of wood, and C is a suitable frame securing the parts together, as usual in the construction of picture-frames.

The face A is provided with openings, as shown, to wit:

First. A vertical series of ten openings D of elongated rectangular shape, each provided with a slide D', adapted to close and disclose the opening. Behind these openings the back is painted yellow, so that when open a yellow field is shown.

Second. A series E of round openings arranged in horizontal and vertical rows of ten each, the horizontal rows being in horizontal line with the openings D. Each of the openings E has a separate slide E' for opening and closing it, and the back behind the opening is painted to show the horizontal rows in different contrasting colors, preferably the first and sixth rows in white, the second and seventh in blue, the third and eighth in red, the fourth and ninth in yellow, and the fifth and tenth in green.

Third. A rectangular opening F, provided with a slide F' (opening to the left) to open and close it. The whole field $F^2$ within this opening is painted yellow; but this field is further provided with small round openings $F^3$, arranged in horizontal rows of five, each row provided with a separate slide $F^4$, (painted yellow.) The field behind these openings is painted in a different color, preferably red, so that when both sets of slides are opened the red fields of ten small openings are disclosed; but if the slides $F^4$ are closed the whole field is yellow.

Fourth. Two groups G, each composed of five round openings, preferably somewhat larger than those of the group E, and each provided with a slide G'. Four openings of each group are at the four corners of a square and the fifth is in the center of the square. The openings at the four corners of each group G have movable fields by means of rotatable painted disks $G^2$, placed behind the face-plate and provided with suitable buttons $G^3$ for turning them. Each rotatable disk is divided into five parts, painted, respectively, white, blue, red, yellow, and green, so that by rotating the disk the field may appear in any desired color on the disk. The opening in the center has a fixed field of red or any other color carried on the disks.

Fifth. A group H of two openings like those forming the corners of the groups G and similarly provided with slides and movable fields and placed in such relation thereto as to form therewith two horizontal rows of five openings.

Sixth. A group I of three openings provided with slides and fixed fields colored like those in the center of the right-hand group G. The openings of this group are located in such complementary relation to openings of the group G and H as to form therewith three vertical rows of three in each row.

The slides provided for the openings forming these various groups are held in suitable guides $a$, which may be either secured to or formed on the back of the face-plate or on the face of the blackboard, and where a number of openings are in the same horizontal row the guides are preferably made continuous. Each slide has a suitable finger-piece $b$, projecting out beyond the face-plate, serving as a stop to limit the movement of the slide, and as all the slides with the exception of the slide F' move in the same horizontal direction it will be seen that the slides of the whole groups or rows of openings with the exception of the slide F' may be moved to open or close by a single sweep of the hand over the face-plate. The operation of the rotatable disks $G^2$ is also obvious.

The mechanical advantages of my construction are that it can be used to illustrate each and every operation in teaching addition, subtraction, multiplication, and division by the objective method, and therefore does away with the multiplicity of existing charts, which impose upon the teacher a time-taking task of hunting after the particular chart, whereas with my apparatus he can produce the required chart almost instantly by the movement of the hand operating the slides with an easy gesture. The face-plate is thus a blackboard arranged for the production of number-pictures by the mere opening of slides, and as each again disappears by closing the slides there need be but one picture brought before the eye, as all the other slides can be closed, so there is nothing to distract the attention of the scholar.

To show the new results which may be accomplished by the use of my apparatus, I will now describe how it can be used. Regarding the groups G, H, and I as a single group of fifteen openings, it will be seen that when they are closed none of the openings appears to the eye, as the slides are black, like the face of the board. When they are opened, they present what may be called "color-dots," and they will be so referred to hereinafter. Ten of these dots can be represented in any one of the five different colors. The rest appear but in one color. By reason of the peculiar grouping of these fifteen dots the teacher can produce any number-picture from two to ten, as shown in Fig. 5—that is, such number-pictures as will most easily become a conception of the mind. The value of these number-pictures is, however, in that they are adapted for the synthetic and analytic study of the number itself. For instance, after representing the number-picture "10" by ten red dots arranged in two rows of five (by opening certain slides of groups G and H) we can change the color of the dots in all the ways necessary—to illustrate, that $9+1=10$, $8+2=10$, $7+3=10$, &c., or that $10-1=9$, $10-2=8$, &c., or $5\times2=10$, $4\times2+2=10$, $3\times2+4=10$, &c., or that $10\div5=2$ or $10\div2=5$, &c. Each number-picture is capable of being thus made the basis of the study of the number itself, and by the methodical use of the groups G, H, and I the numbers from one to ten, which are the foundation-stones of arithmetic, can be taught objectively, thoroughly, and rationally, and as every number-picture can be separated into its component parts and formed anew the four fundamental operations in arithmetic can be readily taught by this analytic and synthetic method of forming such number-pictures. It will be noticed that in none of the number-pictures of groups F, G, H, and I does the number of dots associated at any time in a single row exceed five, and the mental process of counting is thus not required to a conception of more than five. The group D, consisting of ten yellow rectangles, is intended to represent ten tens, and for the purpose of transition from the individual picture represented by ten color-dots to the collective ten, as represented by the rectangular openings, I have provided a separate opening F with two sets of slides. By the use of this opening the child will be readily taught that it takes ten objects to make ten, and in connection with the group D it is used to illustrate all arithmetical operations in addition and subtraction involving numbers below one hundred. The one hundred openings of the group E are mainly intended for multiplication and division. For instance, $5\times5=?$ may be illustrated by disclosing five dots in each of the first five rows. The pupil will now see in different colors five rows of five dots in each row, in all twenty-five. Hence $5\times5=25$ or $25\div5=5$. It is obvious that the number of objects is made more easily discernible to the eye by reason of the different colors. At the same time it captivates and pleases the child and makes teaching easy.

By a teacher the capabilities of the apparatus for illustrating any and all operations in primary arithmetic in harmony with present advanced methods will now be well understood, and its advantages of construction are that it is strong, simple, not likely to get out of order, harmonious with school surroundings, and combining all the valuable features of the devices now in use into a complete system the teaching of which will be facilitated by the use of a guide which I intend to furnish with the apparatus.

What I claim as my invention is—

1. In an arithmetical apparatus in which numbers are represented by color-dots formed by means of colored apertures in a face-plate, of apertures provided with disks rotatively secured behind the face-plate and provided with means for turning each disk upon its center, each disk carrying upon its face different colors and arranged in such relation to one of the apertures that by turning the disk the color of the aperture may be changed.

2. In an arithmetical apparatus in which numbers are represented by color-dots formed by means of colored apertures in a face-plate, of color-dots arranged in groups to form number-pictures composed of ten or any lesser number of color-dots each color-dot being provided with a slide whereby any color-dot may be covered over independently of any other one, and color-disks affixed behind the apertures forming some of the color-dots and adapted to vary the colors of said dots by turning the disk, those not provided with the disks having a fixed and uniform color, whereby in forming a number-picture by suitably opening or closing certain slides, the colors of some of the color-dots composing said number-picture may be varied for the synthetic or analytic consideration of the number represented by the number-picture.

3. In an arithmetical apparatus composed of a face-plate provided with apertures having slides and arranged to form color-dots upon the face-plate adapted to represent numbers by opening the slides, of one or more groups of color-dots as G, each composed of five, grouped to form the number-picture five, four of each group provided with means for changing the color of the dot whereby each dot of the group may be made to appear of a different color from the others.

4. In an arithmetical apparatus, the combination with the face-plate A, and its group or groups of colored apertures G arranged to represent the number-picture "five," each aperture provided with a slide, of color-disks rotatably secured upon the back of the face-plate behind four of the apertures, each color-disk bearing five different colors each adapted to appear in the aperture by rotating the disk.

5. In an arithmetical apparatus, composed of a face-plate provided with apertures having slides and arranged to form color-dots, the combination of the group E of circular color-dots arranged in ten rows of ten each, each row having a different color from the adjacent row, a group D of ten rectangular color-dots, a rectangular color-dot F having ten circular color-dots of a different color placed within its color-field and provided with separate slides, and groups of circular color-dots G, G, H, I, adapted to collectively form number-pictures of ten or less color-dots and having means to vary the color of some of the color-dots.

6. In an arithmetical apparatus, in which numbers are represented by color-dots formed by means of colored apertures in the face-plate having slides for opening and closing the apertures, the combination of one or more groups of circular color-dots for representing numbers numerically, one group as D of rectangular color-dots, and the rectangular color-dot F having in its color-field ten circular color-dots of a different color and controlled by separate slides.

In testimony whereof I affix my signature in presence of two witnesses.

ASMUS F. LORENZEN.

Witnesses:
OTTO F. BARTHEL,
JOSEPH A. NOELKE.